(12) United States Patent
Yoshioka et al.

(10) Patent No.: US 11,647,484 B2
(45) Date of Patent: May 9, 2023

(54) USER TERMINAL AND RADIO COMMUNICATION METHOD

(71) Applicant: NTT DOCOMO, INC., Tokyo (JP)

(72) Inventors: Shohei Yoshioka, Tokyo (JP); Yuki Matsumura, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 108 days.

(21) Appl. No.: 17/054,386

(22) PCT Filed: May 11, 2018

(86) PCT No.: PCT/JP2018/018436
§ 371 (c)(1),
(2) Date: Nov. 10, 2020

(87) PCT Pub. No.: WO2019/215935
PCT Pub. Date: Nov. 14, 2019

(65) Prior Publication Data
US 2021/0227503 A1    Jul. 22, 2021

(51) Int. Cl.
*H04W 72/04* (2023.01)
*H04W 72/14* (2009.01)
(Continued)

(52) U.S. Cl.
CPC ......... *H04W 72/02* (2013.01); *H04W 72/042* (2013.01); *H04W 72/0413* (2013.01); *H04W 72/0446* (2013.01); *H04W 72/0493* (2013.01)

(58) Field of Classification Search
None
See application file for complete search history.

(56) References Cited

U.S. PATENT DOCUMENTS

2010/0008317 A1*  1/2010  Bhattad .............. H04L 5/0073
                                                         370/329
2012/0307755 A1   12/2012  Kim et al.
(Continued)

FOREIGN PATENT DOCUMENTS

| JP | 2013-511937 A | 4/2013 |
| JP | 2014-036427 A | 2/2014 |
| WO | 2017171615 A1 | 10/2017 |

OTHER PUBLICATIONS

Extended European Search Report issued in European Application No. 18917819.7, dated Nov. 10, 2021 (8 pages).
(Continued)

*Primary Examiner* — Sai Aung
(74) *Attorney, Agent, or Firm* — Osha Bergman Watanabe & Burton LLP

(57) ABSTRACT

To appropriately transmit uplink control information even when allocations of uplink control channels used for transmission of the uplink control information overlap each other, a user terminal according to one aspect of the present disclosure includes a transmitting section that transmits transmission confirmation signals for downlink shared channels by using uplink control channel resources, and a control section that determines an uplink control channel to be applied to transmission of a plurality of the transmission confirmation signals, based on a certain selection criterion, when the uplink control channel resources for the plurality of the transmission confirmation signals overlap each other in a time domain.

5 Claims, 12 Drawing Sheets

(51) Int. Cl.
*H04W 72/12* (2023.01)
*H04W 72/02* (2009.01)
*H04W 72/0446* (2023.01)

(56) References Cited

U.S. PATENT DOCUMENTS

| | | |
|---|---|---|
| 2015/0208403 A1 | 7/2015 | Takeda et al. |
| 2016/0366670 A1* | 12/2016 | Feng ..................... H04L 1/1861 |
| 2018/0110042 A1* | 4/2018 | Chen ..................... H04L 5/0055 |
| 2018/0279291 A1* | 9/2018 | Tiirola ................... H04L 1/1861 |
| 2019/0110311 A1 | 4/2019 | Falconetti et al. |
| 2020/0015256 A1* | 1/2020 | Lee ................... H04L 27/26025 |

OTHER PUBLICATIONS

International Search Report issued in PCT/JP2018/018436 dated Jul. 31, 2018 (2 pages).
Written Opinion of the International Searching Authority issued in PCT/JP2018/018436 dated Jul. 31, 2018 (6 pages).
3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).
Notice of Reasons for Refusal issued in Japanese Application No. 2020-517754 dated May 31, 2022 (8 pages).

* cited by examiner

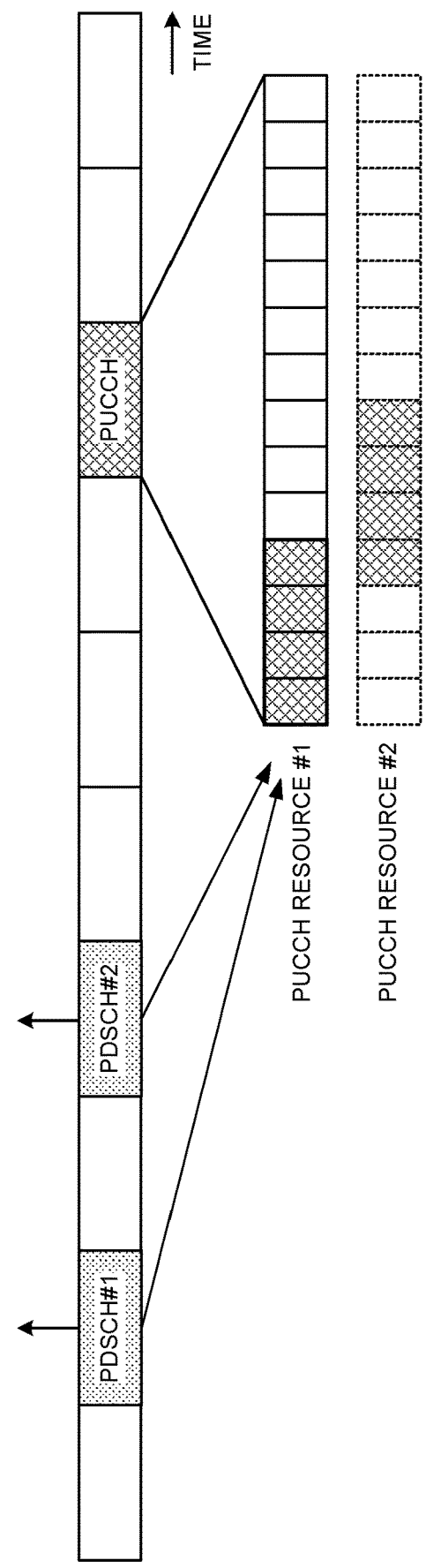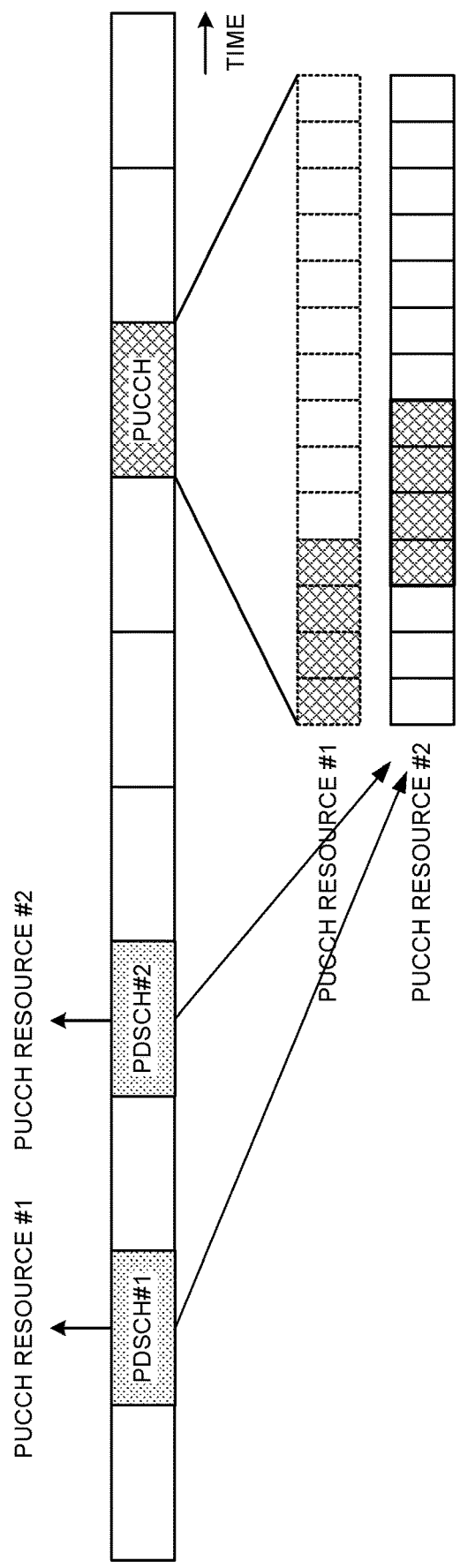

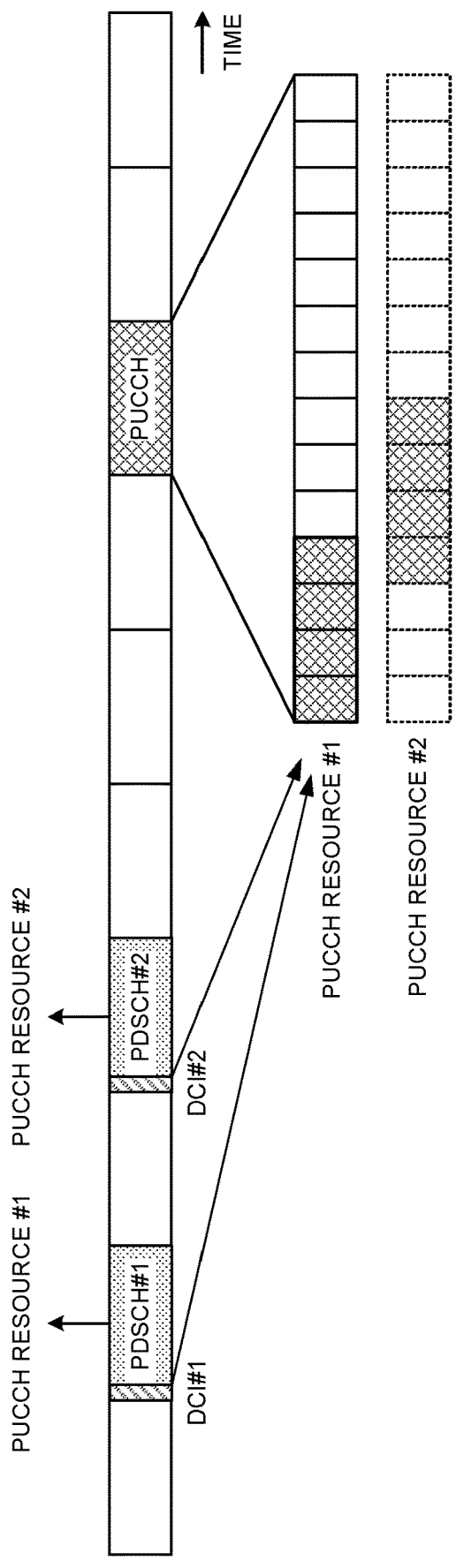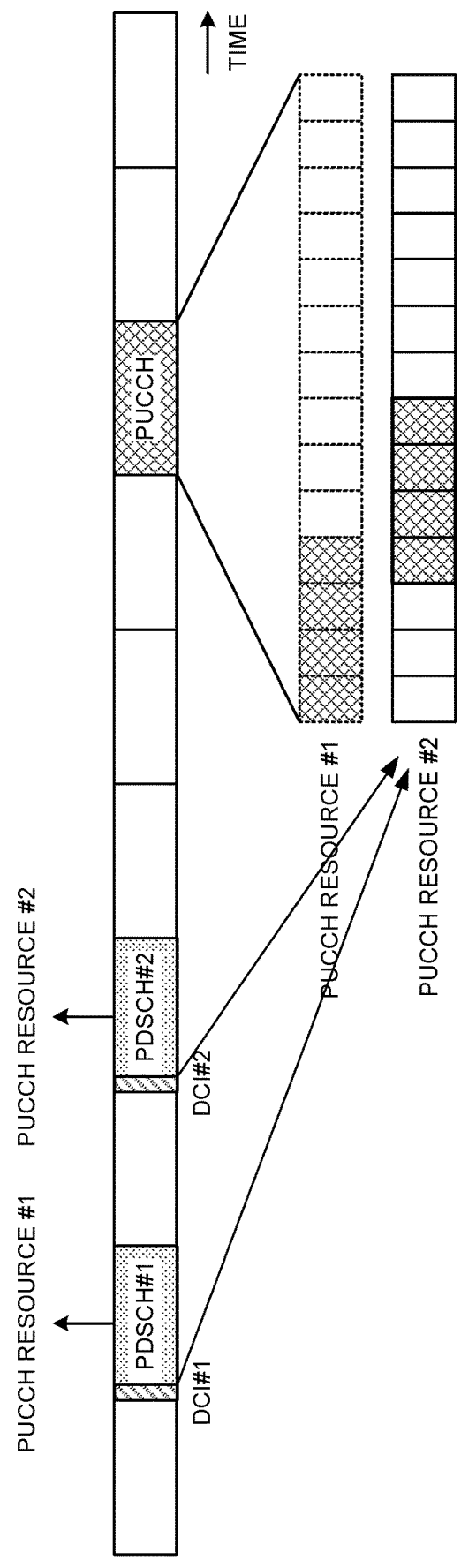

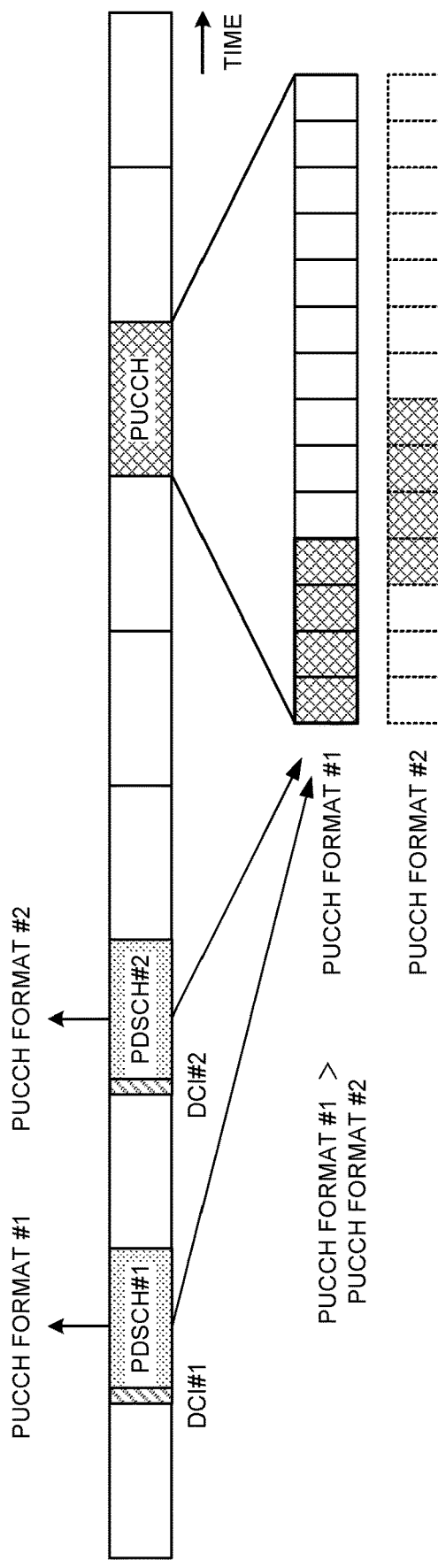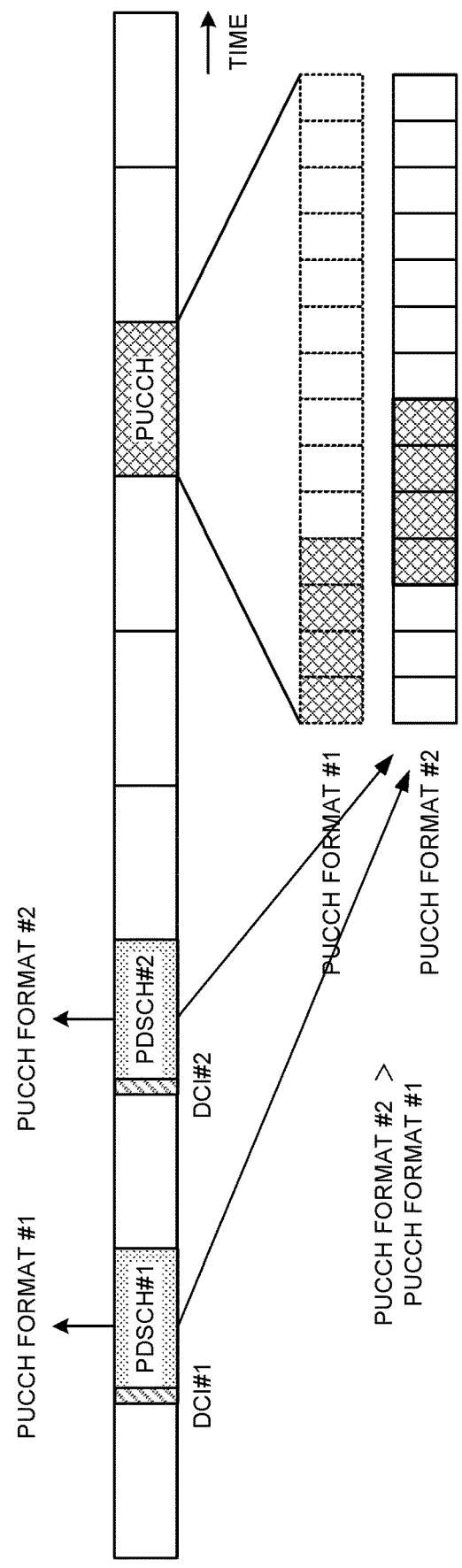

USER TERMINAL AND RADIO COMMUNICATION METHOD

TECHNICAL FIELD

The present disclosure relates to a user terminal and a radio communication method in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). Further, for the purpose of achieving a wider band and higher speed in comparison with LTE, successor systems of LTE (also referred to as, for example, LTE-A (LTE-Advanced), FRA (Future Radio Access), 4G, 5G, 5G+(plus), NR (New RAT), LTE Rel. 14, Rel. 15 or later versions, and so on) has also been under study.

In existing LTE systems (for example, LTE Rel. 8 to Rel. 13), downlink (DL) and/or uplink (UL) communications are performed by using subframes (also referred to as transmission time intervals (TTIs) and so on) each having 1 ms. The subframe is a transmission time unit of one data packet coded by channel coding, and is a processing unit of scheduling, link adaptation, retransmission control (HARQ (Hybrid Automatic Repeat reQuest)), and so on.

Further, in the existing LTE systems (for example, LTE Rel. 8 to Rel. 13), a user terminal transmits uplink control information (UCI) by using an uplink control channel (for example, a PUCCH (Physical Uplink Control Channel)) or an uplink shared channel (for example, a PUSCH (Physical Uplink Shared Channel)). A configuration (format) of the uplink control channel is referred to as a PUCCH format and so on.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (for example, LTE Rel. 15 or later versions, 5G, 5G+, NR and so on), the following scheme has been under study: when UCI is transmitted by using an uplink control channel (for example, a PUCCH), a resource for the uplink control channel (for example, a PUCCH resource) is determined based on higher layer signaling and a certain field value in downlink control information (DCI).

Further, in NR, the following scheme has been under study: when a transmission confirmation signal (also referred to as a HARQ-ACK) for a DL signal (for example, a PDSCH) or the like is transmitted by using a PUCCH, repeated transmission of the PUCCH is supported. Alternatively, the following scheme has been under study: when a plurality of HARQ-ACKs are transmitted in the same transmission period (for example, a slot), different HARQ-ACK codebooks are generated for each of the HARQ-ACKs with which different PUCCH resources are specified.

In this case, the PUCCHs applied to the HARQ-ACKs in some cases overlap each other in the time domain. As described above, when the PUCCHs (or PUCCH resources) collide with each other in the time domain, how to control transmission of the PUCCHs poses a problem. If transmission of the PUCCHs used for transmission of HARQ-ACKs and so on cannot be appropriately performed, throughput may be deteriorated or communication quality may be deteriorated, for example.

In the light of this, the present disclosure has an object to provide a user terminal and a radio communication method that are capable of appropriately transmitting uplink control information even when allocations of uplink control channels used for transmission of the uplink control information overlap each other.

Solution to Problem

A user terminal according to one aspect of the present disclosure includes a transmitting section that transmits transmission confirmation signals for downlink shared channels by using uplink control channel resources, and a control section that determines an uplink control channel to be applied to transmission of a plurality of the transmission confirmation signals, based on a certain selection criterion, when the uplink control channel resources for the plurality of the transmission confirmation signals overlap each other in a time domain.

Advantageous Effects of Invention

According to one aspect of the present disclosure, the uplink control information can be appropriately transmitted even when allocations of the uplink control channels used for transmission of the uplink control information overlap each other.

BRIEF DESCRIPTION OF DRAWINGS

FIG. 4A and FIG. 4B are each a diagram for describing a selection criterion for determining a PUCCH resource according to a first aspect;

FIG. 5A and FIG. 5B are each a diagram for describing a selection criterion for determining a PUCCH resource according to a second aspect;

FIG. 6A and FIG. 6B are each a diagram for describing a selection criterion for determining a PUCCH resource according to a third aspect;

DESCRIPTION OF EMBODIMENTS

Figure 1:
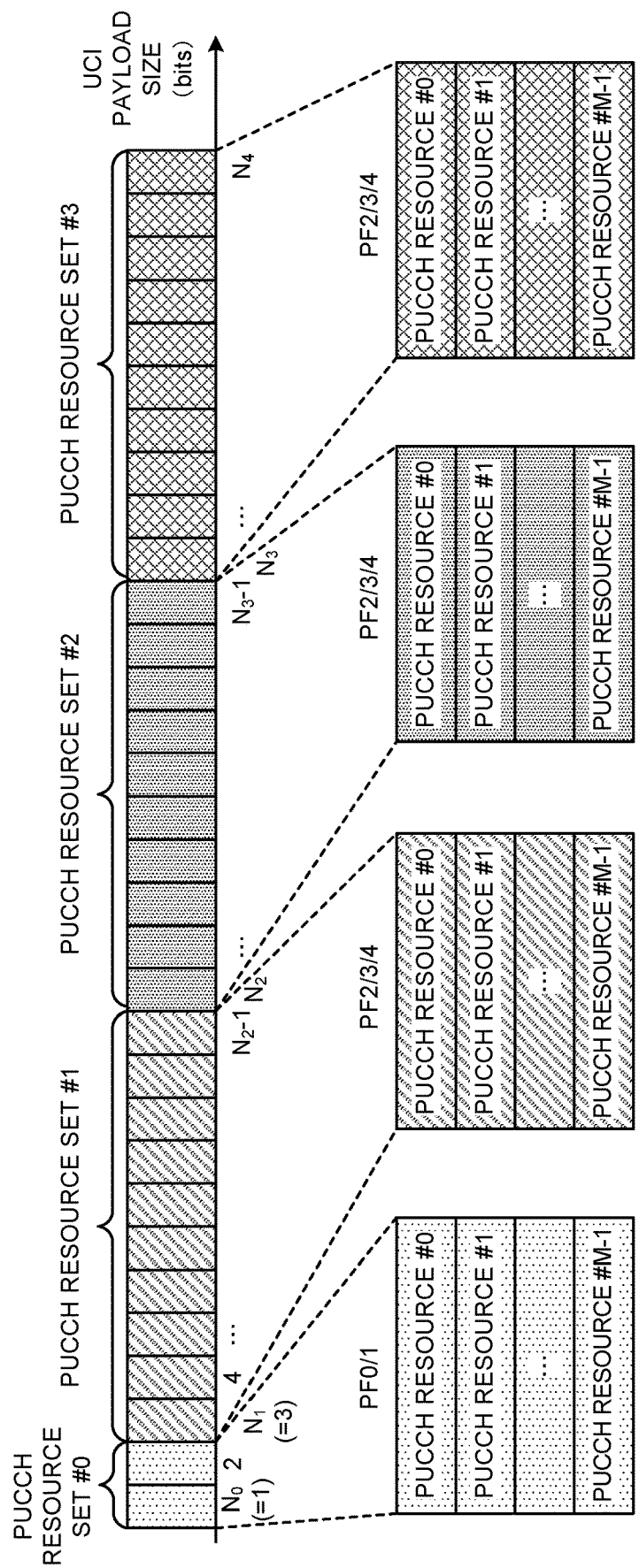
FIG. 1 is a diagram to show an example of allocation of PUCCH resources.

In future radio communication systems (for example, LTE Rel. 15 or later versions, 5G, NR and so on), a configuration (also referred to as a format, a PUCCH format (PF), and so on) for an uplink control channel (for example, a PUCCH) used for transmission of UCI has been under study. For example, in LTE Rel. 15, supporting five types of PFs, i.e., PF0 to PF4, has been under study. Note that the terms of PFs used below are merely an example, and different terms may be used.

For example, PF0 and PF1 are each a PF that is used for transmission of UCI (for example, transmission confirmation information (also referred to as an HARQ-ACK (Hybrid Automatic Repeat reQuest-Acknowledge), an ACK, a NACK, or the like)) of up to 2 bits. PF0 can be allocated to 1 or 2 symbols, and is thus also referred to as a short PUCCH, a sequence-based short PUCCH, or the like. In contrast, PF1 can be allocated to 4 to 14 symbols, and is thus also referred to as a long PUCCH or the like. In PF1, a plurality of user terminals may be code-division multiplexed (CDM) in the same PRB by using block-wise spreading in the time domain with the use of at least one of a CS and an OCC.

PF2 to PF4 are each a PF that is used for transmission of UCI (for example, channel state information (CSI) (or, CSI and an HARQ-ACK and/or a scheduling request (SR))) of more than 2 bits. PF2 can be allocated to 1 or 2 symbols, and is thus also referred to as a short PUCCH and so on. In contrast, PF3 and PF4 can each be allocated to 4 to 14 symbols, and are thus each also referred to as a long PUCCH and so on. In PF4, a plurality of user terminals may be multiplexed in CDM by using block-wise spreading (in the frequency domain) before DFT.

Allocation of resources (for example, PUCCH resources) used for transmission of the uplink control channel is performed by using higher layer signaling and/or downlink control information (DCI). Here, it is only necessary that the higher layer signaling be, for example, at least one of RRC (Radio Resource Control) signaling, system information (for example, at least one of RMSI (Remaining Minimum System Information), OSI (Other system information), an MIB (Master Information Block), and an SIB (System Information Block)), and broadcast information (PBCH (Physical Broadcast Channel)).

Specifically, one or more sets (PUCCH resource sets) respectively including one or more PUCCH resources are reported to (configured for) the user terminal by using the higher layer signaling. For example, K (for example, $1 \leq K \leq 4$) PUCCH resource sets may be reported to the user terminal from the radio base station. Each of the PUCCH resource sets may include M (for example, $8 \leq M \leq 32$) PUCCH resources.

The user terminal may determine a single PUCCH resource set out of the K configured PUCCH resource sets, based on a payload size of the UCI (UCI payload size). The UCI payload size may be the number of bits of UCI not including a cyclic redundancy check (CRC (Cyclic Redundancy Code)) bit.

The user terminal may determine a PUCCH resource to be used for transmission of the UCI out of the M PUCCH resources included in the determined PUCCH resource set, based on at least one of DCI and implicit information (also referred to as implicit indication information, an implicit index, or the like).

FIG. 1 is a diagram to show an example of allocation of the PUCCH resources. In FIG. 1, as an example, it is assumed that K=4, and four PUCCH resource sets #0 to #3 are configured for the user terminal from the radio base station by using the higher layer signaling. It is also assumed that each of PUCCH resource sets #0 to #3 includes M (for example, $8 \leq M \leq 32$) PUCCH resources #0 to #M−1. Note that the number of PUCCH resources included in each of the PUCCH resource sets may be the same or may be different.

As shown in FIG. 1, when PUCCH resource sets #0 to #3 are configured for the user terminal, the user terminal selects any one of the PUCCH resource sets, based on the UCI payload size.

For example, when the UCI payload size is 1 or 2 bits, PUCCH resource set #0 is selected. When the UCI payload size is 3 bits or more and $N_2$-1 bits or less, PUCCH resource set #1 is selected. When the UCI payload size is $N_2$ bits or more and $N_3$-1 bits or less, PUCCH resource set #2 is selected. In a similar manner, when the UCI payload size is $N_3$ bits or more and $N_3$-1 bits or less, PUCCH resource set #3 is selected.

As described above, the range of the UCI payload size from which PUCCH resource set #i (i=0, . . . , K−1) is selected is indicated as $N_i$ bits or more and $N_{i+1}$−1 bits or less (that is, $\{N_i, N_{i+1}-1\}$ bits).

Here, the start positions (start bit numbers) $N_0$ and $N_1$ of the UCI payload size for PUCCH resource sets #0 and #1 may be 1 and 3, respectively. In this manner, PUCCH resource set #0 is selected when the UCI of up to 2 bits is transmitted, and thus PUCCH resource set #0 may include PUCCH resources #0 to #M−1 for at least one of PF0 and PF1. In contrast, any one of PUCCH resource sets #1 to #3 is selected when the UCI of more than 2 bits is transmitted, and thus each of PUCCH resource sets #1 to #3 may include PUCCH resources #0 to #M−1 for at least one of PF2, PF3, and PF4.

In NR, PUCCH resources for a plurality of HARQ-ACKs may overlap each other in the time domain. Specifically, PUCCH signals for HARQ-ACKs may collide with each other. One example of such a case is a case where, as shown in FIG. 2A, PUCCH signals for a plurality of HARQ-ACKs are repeatedly transmitted.

Figure 2A:
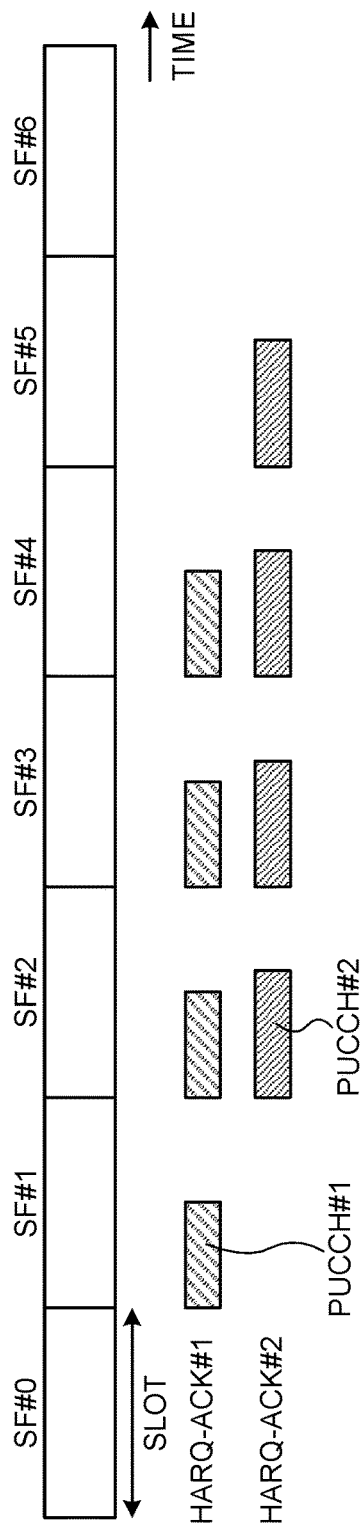
FIG. 2A and FIG. 2B each shows a case in which PUCCH signals for HARQ-ACKs collide with each other.

FIG. 2A shows a case in which the UE applies repeated transmission to PUCCH #1 that is used for transmission of HARQ-ACK #1 for PDSCH #1 and PUCCH #2 that is used for transmission of HARQ-ACK #2 for PDSCH #2. A PUCCH signal (PUCCH #1) of HARQ-ACK #1 starts being transmitted from slot #1, and is repeatedly transmitted four times (up to slot #4). The PUCCH signal (PUCCH #1) of HARQ-ACK #1 starts being transmitted from slot #2, and is repeatedly transmitted four times (up to slot #5).

In this case, the start slot of PUCCH #1 precedes the start slot of PUCCH #2 with respect to time (start timings are different). As described above, when repeated transmission of the PUCCHs is performed, the repeated transmission is applied with start slots (start positions) of both the PUCCH transmissions being different from each other (for example, different HARQ-ACK codebooks are generated), and different PUCCHs are transmitted in the same time domain, the PUCCHs may collide with each other (slots #2 to #4).

Figure 2B:
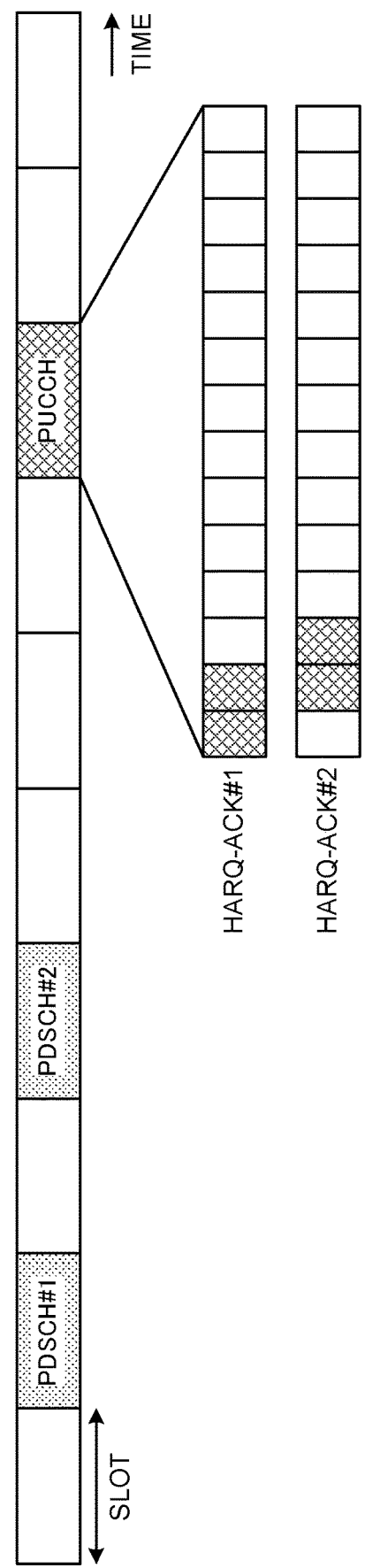

Further, also when HARQ-ACKs for the PDSCHs scheduled in respective pieces of DCI used to report different PUCCH resources are transmitted by using different HARQ-ACK codebooks, the PUCCHs may collide with each other. For example, as shown in FIG. 2B, when HARQ-ACKs for the PDSCHs transmitted in different slots are transmitted on the PUCCHs configured in different PUCCH resources of the same slot, the PUCCHs collide with each other in the time domain.

As described above, when the PUCCHs (or PUCCH resources) collide with each other in the time domain, how to control transmission of the PUCCHs poses a problem; however, this problem has not yet been fully discussed to date.

The inventors of the present invention came up with the idea of determining a PUCCH to be used for HARQ-ACK transmission, based on a certain selection criterion, when PUCCHs (or PUCCH resources) configured in respective transmissions of a plurality of pieces of UCI (for example, HARQ-ACKs) overlap each other in the time domain.

Specifically, in the present disclosure, uplink control information is appropriately transmitted even when allocations of uplink control channels used for transmission of the uplink control information overlap each other as follows: when transmission confirmation signals for downlink shared channels are transmitted by using uplink control channel resources and the uplink control channel resources for the plurality of transmission confirmation signals overlap each other in the time domain, an uplink control channel to be applied to transmission of the plurality of transmission confirmation signals is determined based on the certain selection criterion.

An embodiment according to the present invention will be described below in detail with reference to the drawings. Each of aspects illustrated below may be applied individually, or may be applied in combination. Note that, in the following description, the PUCCH resource and the PUCCH format may be interchangeably interpreted as appropriate.

(First Aspect)

The present aspect will describe a case in which the certain selection criterion is based on a certain parameter of a PUCCH resource configured for each HARQ-ACK. Examples of the certain parameter herein include PUCCH duration, PUCCH capacity, PUCCH transmission timing, and so on. Note that the certain parameter described herein is merely an example, and is not limited to those described above. A parameter that can be used for determining a PUCCH resource applied for transmission of a plurality of HARQ-ACKs is included in the present aspect.

(1) PUCCH Duration

When PUCCH duration is used as the certain selection criterion, the HARQ-ACKs are transmitted by using PUCCH resources having the longest PUCCH duration out of a plurality of PUCCH resources, or the HARQ-ACKs are transmitted by using PUCCH resources having the shortest PUCCH duration out of a plurality of PUCCH resources.

Figure 3:
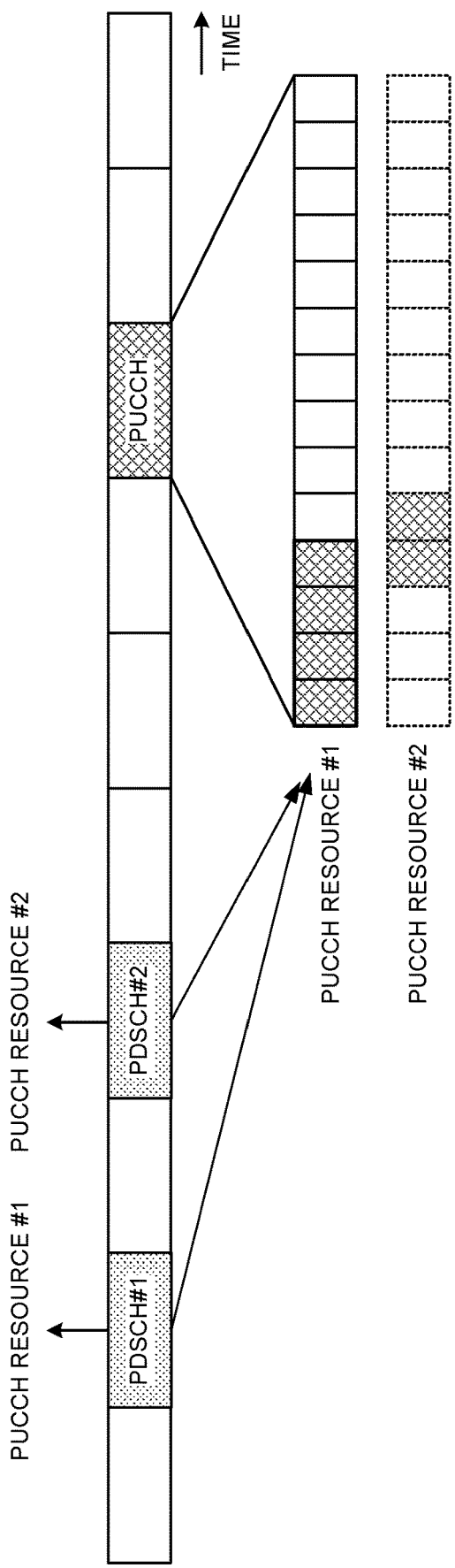
FIG. 3 is a diagram for describing a selection criterion for determining a PUCCH resource.

In FIG. 3, PUCCH resources for transmitting the HARQ-ACKs for PDSCH #1 are configured as PUCCH resource #1, and PUCCH resources for transmitting the HARQ-ACKs for PDSCH #2 are configured as PUCCH resource #2. In this case, if the selection criterion specifies the use of the PUCCH resources having the longest PUCCH duration, the plurality of HARQ-ACKs are transmitted by using PUCCH resource #1. In contrast, if the selection criterion specifies the use of the PUCCH resources having the shortest PUCCH duration, the plurality of HARQ-ACKs are transmitted by using PUCCH resource #2.

When the PUCCH resources having the longest PUCCH duration are used as the selection criterion, PUCCH capacity can be increased and transmission power can be thus increased. As a result, the HARQ-ACKs can be more securely transmitted. When the PUCCH resources having the shortest PUCCH duration are used as the selection criterion, transmission delay can be reduced.

(2) PUCCH Capacity

When PUCCH capacity is used as the certain selection criterion, the HARQ-ACKs are transmitted by using PUCCH resources having the largest PUCCH capacity out of a plurality of PUCCH resources, or the HARQ-ACKs are transmitted by using PUCCH resources having the smallest PUCCH capacity out of a plurality of PUCCH resources.

When the PUCCH resources having the largest PUCCH capacity are used as the selection criterion, a larger number of HARQ-ACKs can be transmitted. When the PUCCH resources having the smallest PUCCH capacity are used as the selection criterion, efficiency of the use of radio resources can be enhanced.

(3) PUCCH Transmission Timing

When PUCCH transmission timing is used as the certain selection criterion, the HARQ-ACKs are transmitted by using PUCCH resources with the earliest PUCCH transmission timing with respect to time out of a plurality of PUCCH resources, or the HARQ-ACKs are transmitted by using PUCCH resources with the latest PUCCH transmission timing with respect to time out of a plurality of PUCCH resources.

In FIGS. 4A and 4B, PUCCH resources for transmitting the HARQ-ACKs for PDSCH #1 are configured as PUCCH resource #1, and PUCCH resources for transmitting the HARQ-ACKs for PDSCH #2 are configured as PUCCH resource #2. In this case, if the selection criterion specifies the use of the PUCCH resources with the earliest PUCCH transmission timing with respect to time, as shown in FIG. 4A, the plurality of HARQ-ACKs are transmitted by using PUCCH resource #1. In contrast, if the selection criterion specifies the use of the PUCCH resources with the latest PUCCH transmission timing with respect to time, as shown in FIG. 4B, the plurality of HARQ-ACKs are transmitted by using PUCCH resource #2.

When the PUCCH resources with the earliest PUCCH transmission timing with respect to time are used as the selection criterion, a longer time period can be secured as setup time before transmission in the user terminal. In this manner, processing time for the UE can be secured, and an increase of a processing load can be prevented. When the PUCCH resources with the latest PUCCH transmission timing with respect to time are used as the selection criterion, PUCCH resources can be selected according to the latest communication state.

(Second Aspect)

The present aspect will describe a case in which the certain selection criterion is based on timing at which each PUCCH (or PUCCH resource) for a HARQ-ACK is configured, or transmission timing of DCI used to configure each PUCCH for a HARQ-ACK.

(1) PUCCH Configuration Timing

When the timing at which each PUCCH for a HARQ-ACK is configured is used as the certain selection criterion, the HARQ-ACKs are transmitted by using the PUCCH resources in which the PUCCH resources are configured the earliest with respect to time out of a plurality of PUCCH resources, or the HARQ-ACKs are transmitted by using the PUCCH resources in which the PUCCH resources are configured the latest with respect to time out of a plurality of PUCCH resource.

In FIGS. 5A and 5B, PUCCH resources for transmitting the HARQ-ACKs for PDSCH #1 are configured as PUCCH resource #1 with DCI #1, and PUCCH resources for transmitting the HARQ-ACKs for PDSCH #2 are configured as PUCCH resource #2 with DCI #2. In this case, if the selection criterion specifies the use of the PUCCH resources with the earliest PUCCH configuration timing with respect to time, as shown in FIG. 5A, the plurality of HARQ-ACKs are transmitted by using PUCCH resource #1. In contrast, if the selection criterion specifies the use of the PUCCH resources with the latest PUCCH configuration timing with respect to time, as shown in FIG. 5B, the plurality of HARQ-ACKs are transmitted by using PUCCH resource #2.

When the PUCCH resources with the earliest PUCCH configuration timing with respect to time are used as the selection criterion, a longer time period can be secured as setup time before transmission in the user terminal. When the PUCCH resources with the latest PUCCH configuration timing with respect to time are used as the selection criterion, PUCCH resources can be selected according to the latest communication state.

(2) DCI Transmission Timing

When the transmission timing of DCI used to configure each PUCCH for a HARQ-ACK is used as the certain selection criterion, the HARQ-ACKs are transmitted by using PUCCH resources specified using DCI that is transmitted the earliest with respect to time out of a plurality of PUCCH resources, or the HARQ-ACKs are transmitted by using PUCCH resources specified using DCI that is transmitted the latest with respect to time out of a plurality of PUCCH resources.

When the PUCCH resources specified by using DCI that is transmitted the earliest with respect to time are used as the selection criterion, a longer time period can be secured as setup time before transmission in the user terminal. When the PUCCH resources specified by using DCI that is transmitted the latest with respect to time are used as the selection criterion, PUCCH resources can be selected according to the latest communication state.

Further, the present aspect also includes a case in which the selection criterion is based on information related to the DCI. Examples of such DCI-related information include a control resource set (CORESET) ID, fallback DCI, non-fallback DCI, and so on. The PUCCH resources for transmitting the HARQ-ACKs may be determined based on information that is included in the above-described DCI-related information or that is associated with the DCI-related information.

(Third Aspect)

The present aspect will describe a case in which the certain selection criterion is based on a PUCCH format. Note that, when the PUCCH format is selected according to a total number of bits of the HARQ-ACKs, a total number of bits of a plurality of HARQ-ACKs may be used as the certain selection criterion.

When a plurality of PUCCH formats are used as the certain selection criterion, the HARQ-ACKs are transmitted by using PUCCH resources corresponding to a prioritized PUCCH format. The prioritized PUCCH format may be determined based on the total number of bits of the plurality of HARQ-ACKs, or the prioritized PUCCH format may be determined in advance.

For example, when the total number (N UCI) of bits of the plurality of HARQ-ACKs is larger than 2 bits, PUCCH resources corresponding to a specific PUCCH format (for example, PUCCH format 2/3/4) are selected. Note that, when a specific PUCCH format has not been configured yet, one HARQ-ACK out of the HARQ-ACKs to collide may be reserved, and the other HARQ-ACKs may be discarded.

Further, when the total number (N UCI) of bits of the plurality of HARQ-ACKs is equal to or less than 2 bits, PUCCH resources may be selected from all of the PUCCH resources (or the PUCCH formats). Note that the description herein illustrates a case in which different PUCCH resources are selected between a case in which the total number (N UCI) of bits of the plurality of HARQ-ACKs exceeds 2 bits and a case in which the total number of bits is equal to or less than 2 bits. However, in the present invention, the total number of bits may be 1 bit or 3 bits or more, instead of 2 bits.

In FIGS. 6A and 6B, PUCCH resources for transmitting the HARQ-ACKs for PDSCH #1 correspond to PUCCH format #1, and PUCCH resources for transmitting the HARQ-ACKs for PDSCH #2 correspond to PUCCH format #2. In this case, if the selection criterion gives higher priority to PUCCH format #1 over PUCCH format #2, as shown in FIG. 6A, the plurality of HARQ-ACKs are transmitted by using PUCCH format #1. If the selection criterion gives higher priority to PUCCH format #2 over PUCCH format #1, as shown in FIG. 6B, the plurality of HARQ-ACKs are transmitted by using PUCCH format #2.

For example, by setting higher priority to PUCCH formats having large capacity (for example, PUCCH formats 2 to 4), appropriate transmission can be performed even when a plurality of HARQ-ACKs are transmitted.

(Fourth Aspect)

In the present aspect, when all of or a part of the PUCCH resources for transmitting the HARQ-ACKs collide with each other in the time domain, the following processing is performed.

The description herein assumes a case in which application of repeated transmission of the PUCCHs of the HARQ-ACKs is configured using an RRC parameter and a case in which the plurality of PUCCHs (or PUCCH resources) are started at their respective different slots. When repeated periods of the plurality of PUCCHs overlap each other, the UE may apply at least any one of the first aspect to the third aspect to only collision slots.

In this manner, by applying configured PUCCH resources to the slots without collision and applying certain PUCCH resources to the slots with collision, the UE can appropriately transmit the HARQ-ACKs repeatedly for a transmission period. Note that at least any one of the first aspect to the third aspect may be applied to the PUCCHs whose HARQ-ACK codebooks are configured separately even when the start timings of repeated transmission are the same.

Further, as a method of generating the HARQ-ACK codebooks, the following case may be considered in which the same codebooks are applied to the HARQ-ACKs having the same transmission timing of the HARQ-ACKs reported using DCI (for example, slots to which PUCCH resources are allocated). In this case as well, when repeated periods of the plurality of PUCCHs overlap each other, the UE may apply at least any one of the first aspect to the third aspect to only the collision slots.

Alternatively, as a method of generating the HARQ-ACK codebooks, the following case may be considered in which the same codebooks are applied to the HARQ-ACKs having the same transmission timing of the HARQ-ACKs reported using DCI and PUCCH resources. In contrast, even when the transmission timings of the HARQ-ACKs reported using DCI are the same, the HARQ-ACKs having different PUCCH resources are transmitted with different codebooks. In this case, the HARQ-ACKs (for example, HARQ-ACKs corresponding to different codebooks) may collide with each other in the time domain. For this reason, when collision occurs, at least any one of the first aspect to the third aspect may be applied.

<Variations>

When the plurality of PUCCHs overlap each other in the time domain, any one of the plurality of PUCCHs may be dropped. In this case, the HARQ-ACKs to be transmitted (or the HARQ-ACKs to be dropped) may be determined based on the certain selection criterion. As the certain selection criterion, any one of those described in the above aspects may be applied.

Alternatively, the radio base station may control scheduling in such a manner that the plurality of PUCCH resources do not collide with each other. In this case, the UE may control transmission of the PUCCHs, assuming that different PUCCHs do not collide with each other.

Note that the first aspect to the fourth aspect described above illustrate a case in which there are two types of PUCCH resources for transmitting the HARQ-ACKs in the user terminal. However, the present invention is not limited to this. Even when there are three or more types of PUCCH resources for transmitting the HARQ-ACKs in the user terminal, the present invention can be applied in a similar manner.

(Radio Communication System)

Hereinafter, a structure of a radio communication system according to one embodiment of the present invention will be described. In this radio communication system, the radio communication method according to each embodiment of the present invention described above may be used alone or may be used in combination for communication.

Figure 7:
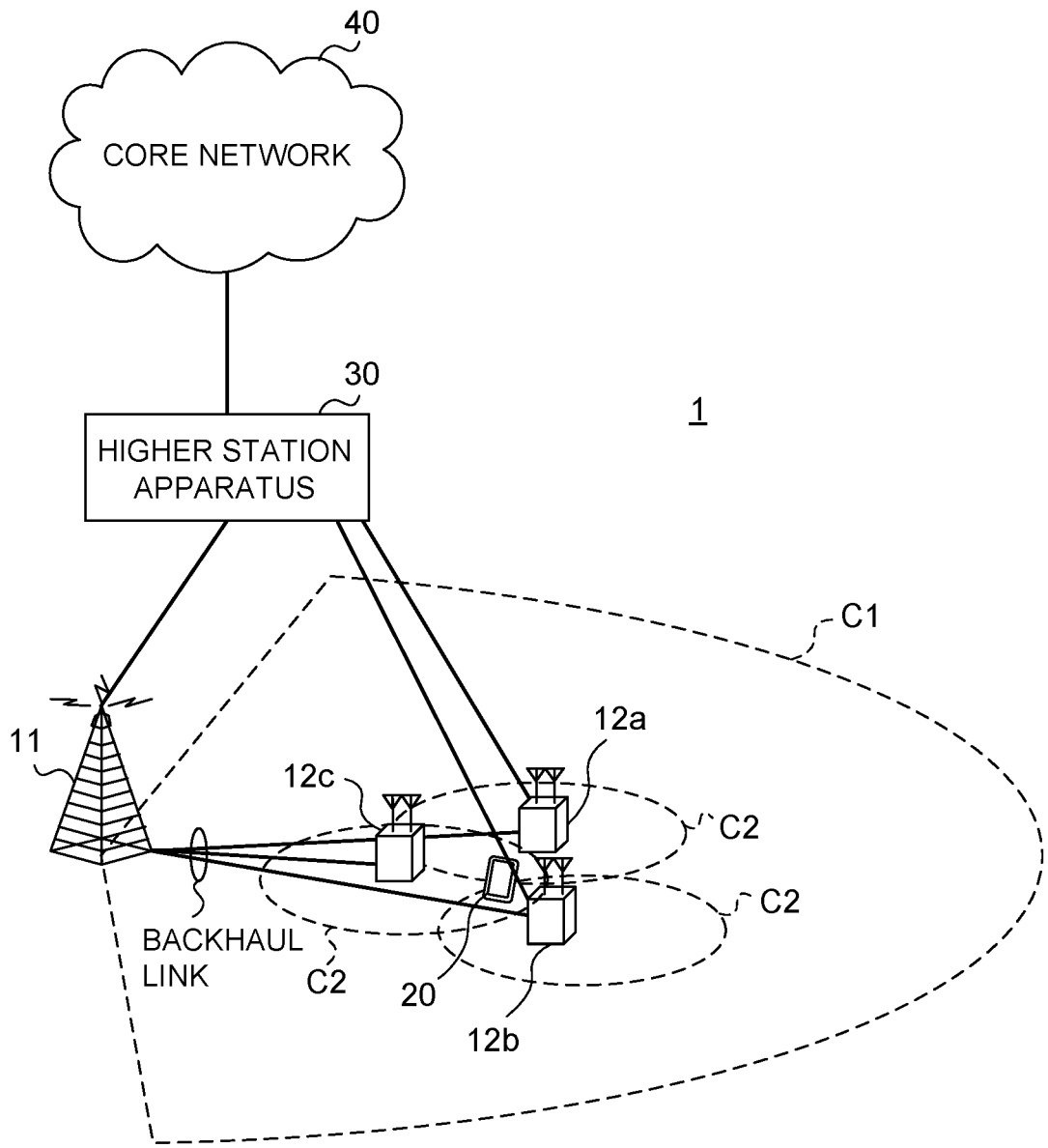
FIG. 7 is a diagram to show an example of a schematic structure of a radio communication system according to one embodiment.

FIG. 7 is a diagram to show an example of a schematic structure of the radio communication system according to one embodiment of the present invention. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 may adopt CA or DC by using a plurality of cells (CCs) (for example, five or less CCs, or six or more CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," an "aggregate node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier transmission scheme to perform communication by dividing a frequency band into a plurality of narrow frequency bands (subcarriers) and mapping data to each subcarrier. SC-FDMA is a single carrier transmission scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH is communicated on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, transmission confirmation information, a scheduling request (SR), and so on are communicated on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are communicated as downlink reference signals. In the radio communication system 1, a measurement reference signal (SRS (Sounding Reference Signal)), a demodulation reference signal (DMRS), and so on are communicated as uplink reference signals. Note that DMRS may be referred to as a "user terminal specific reference signal (UE-specific Reference Signal)." Communicated reference signals are by no means limited to these.

(Radio Base Station)

Figure 8:
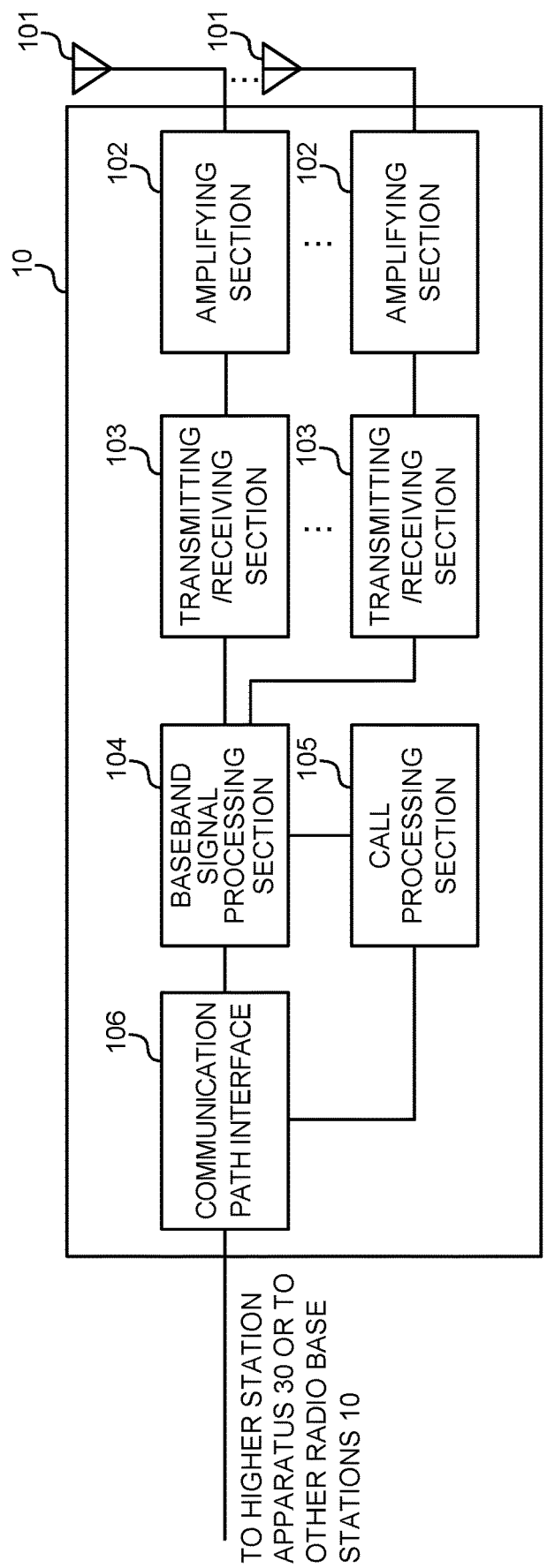
FIG. 8 is a diagram to show an example of an overall structure of a radio base station according to one embodiment.

FIG. 8 is a diagram to show an example of an overall structure of the radio base station according to one embodiment of the present invention. A radio base station 10 includes a plurality of transmitting/receiving antennas 101, amplifying sections 102, transmitting/receiving sections 103, a baseband signal processing section 104, a call processing section 105 and a communication path interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the communication path interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a pre-coding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present invention pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and output the baseband signal to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and the result is forwarded to the higher station apparatus 30 via the communication path interface 106. The call processing section 105 performs call processing (setting up, releasing and so on) for communication channels, manages the state of the radio base station 10, manages the radio resources and so on.

The communication path interface 106 transmits and/or receives signals to and/or from the higher station apparatus 30 via a certain interface. The communication path interface 106 may transmit and/or receive signals (backhaul signaling) with other radio base stations 10 via an inter-base station interface (for example, an optical fiber in compliance with the CPRI (Common Public Radio Interface) and an X2 interface).

Each of the transmitting/receiving sections 103 transmits a PDSCH signal and a PDCCH signal to the user terminal. The PDCCH signal includes DCI used to configure a PUCCH resource for a HARQ-ACK.

Figure 9:
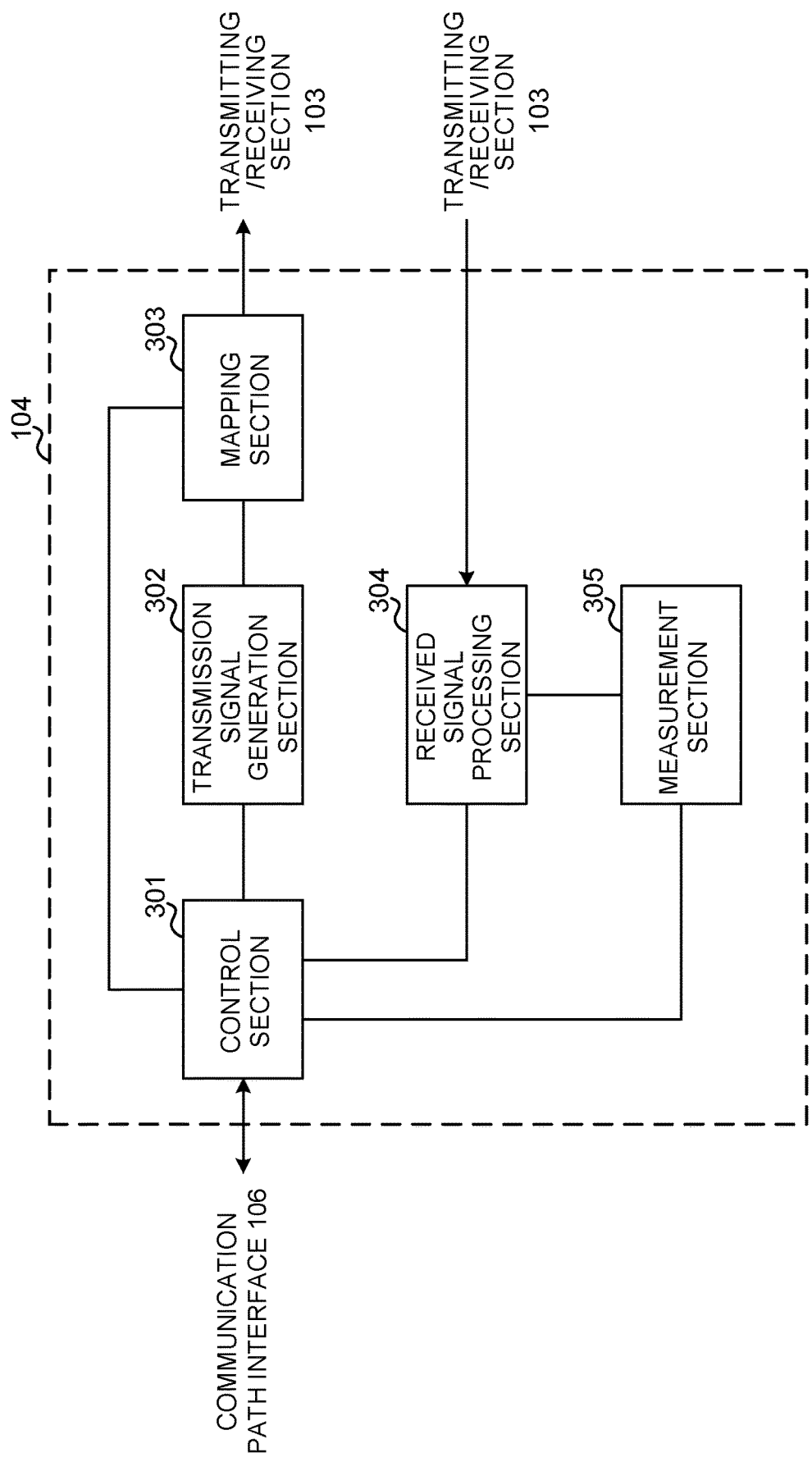
FIG. 9 is a diagram to show an example of a functional structure of the radio base station according to one embodiment.

FIG. 9 is a diagram to show an example of a functional structure of the radio base station according to one embodiment of the present invention. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present invention pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls scheduling (for example, resource allocation) of system information, a downlink data signal (for example, a signal transmitted on a PDSCH), and a downlink control signal (for example, a signal transmitted on a PDCCH and/or an EPDCCH, transmission confirmation information, and so on). Based on the results of determining necessity or not of retransmission control to the uplink data signal, or the like, the control section 301 controls generation of a downlink control signal, a downlink data signal, and so on. The control section 301 controls the scheduling of a synchronization signal (for example, a PSS (Primary Synchronization Signal)/an SSS (Secondary Synchronization Signal)), a downlink reference signal (for example, a CRS, a CSI-RS, a DMRS), and so on.

Further, the control section 301 controls scheduling of an uplink data signal (for example, a signal transmitted on the PUSCH), an uplink control signal (for example, a signal transmitted on the PUCCH and/or the PUSCH, transmission confirmation information, and so on), a random access preamble (for example, a signal transmitted on the PRACH), an uplink reference signal, and so on.

The transmission signal generation section 302 generates downlink signals (downlink control signals, downlink data signals, downlink reference signals and so on) based on instructions from the control section 301 and outputs the downlink signals to the mapping section 303. The transmission signal generation section 302 can be constituted with a signal generator, a signal generation circuit or signal generation apparatus that can be described based on general understanding of the technical field to which the present invention pertains.

For example, the transmission signal generation section 302 generates DL assignment to report assignment information of downlink data and/or UL grant to report assignment information of uplink data, based on instructions from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to certain radio resources, based on instructions from the control section 301, and outputs these to the transmitting/receiving sections 103. The mapping section 303 can be constituted with a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present invention pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present invention pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI), and so on. The measurement results may be output to the control section 301.

(User Terminal)

The user terminal transmits HARQ-ACKs for PDSCHs by using PUCCH resources, and when the PUCCH resources for the plurality of HARQ-ACKs overlap each other in the time domain, the user terminal determines a PUCCH to be applied to transmission of the plurality of HARQ-ACKs, based on a certain selection criterion.

Figure 10:
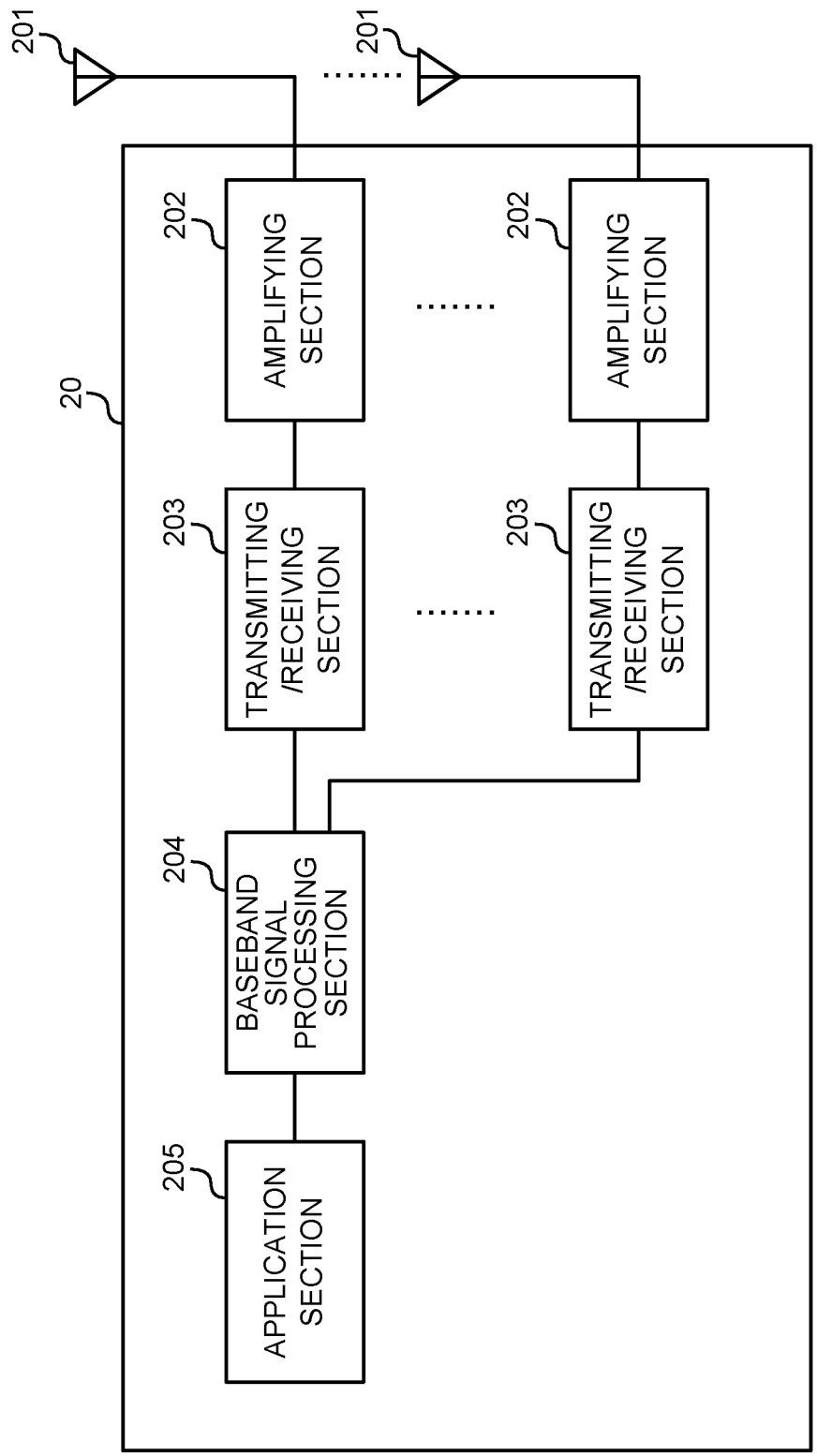
FIG. 10 is a diagram to show an example of an overall structure of a user terminal according to one embodiment.

FIG. 10 is a diagram to show an example of an overall structure of a user terminal according to one embodiment of the present invention. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present invention pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Further, each of the transmitting/receiving sections 203 transmits the HARQ-ACK for the PDSCH by using the PUCCH.

Figure 11:
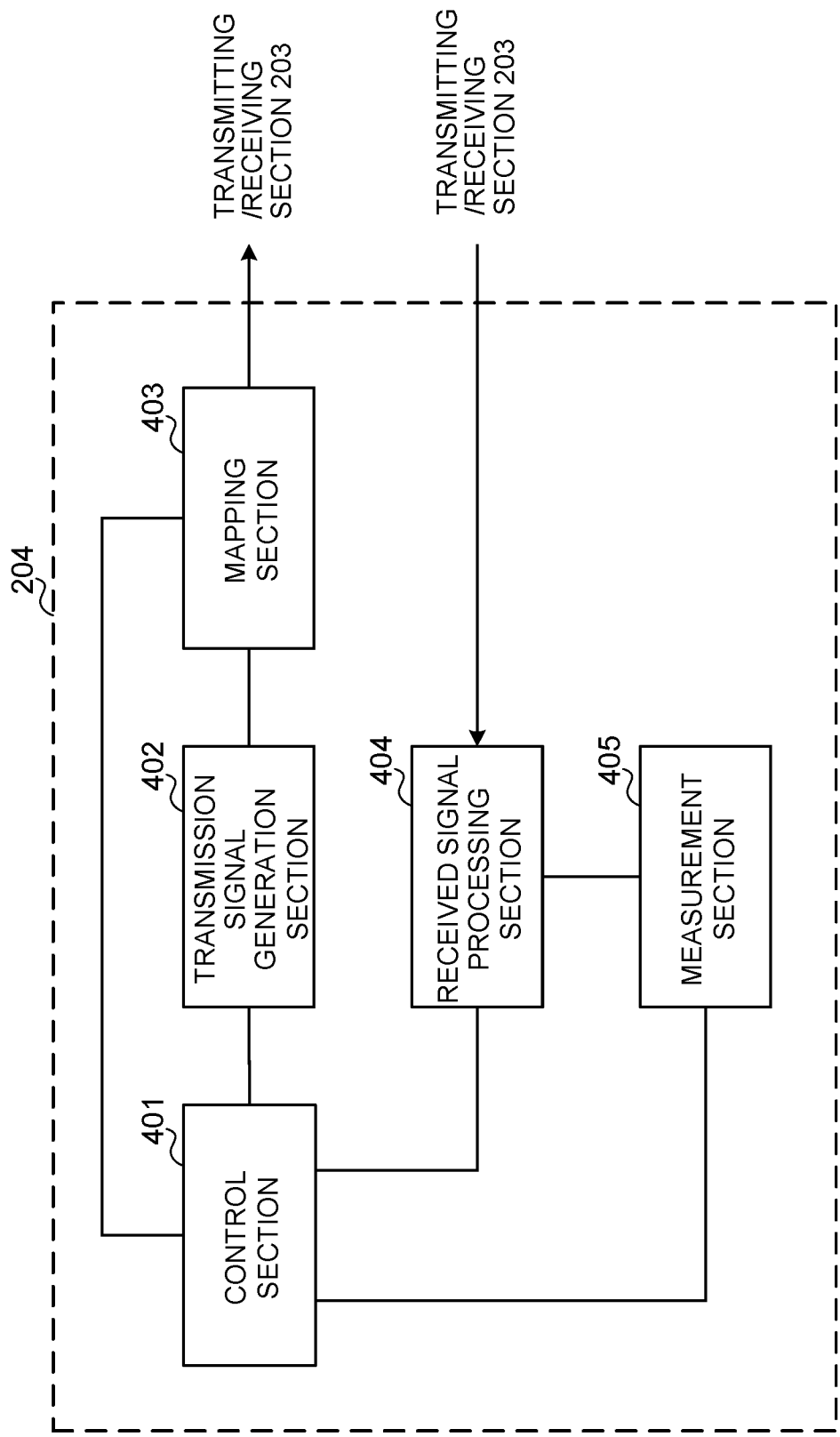
FIG. 11 is a diagram to show an example of a functional structure of the user terminal according to one embodiment.

FIG. 11 is a diagram to show an example of a functional structure of a user terminal according to one embodiment of the present invention. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present invention pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal, and so on.

Further, the control section 401 determines a PUCCH to be applied to transmission of a plurality of HARQ-ACKs, based on a certain selection criterion, when PUCCH resources for the plurality of HARQ-ACKs overlap each other in the time domain.

As the certain selection criterion, the control section 401 uses a certain parameter of each of the PUCCH resources configured for each of the HARQ-ACKs. Further, as the certain selection criterion, the control section 401 uses timing at which each PUCCH for the HARQ-ACK is configured or transmission timing of DCI used to configure each PUCCH for the HARQ-ACK. Further, as the certain selection criterion, the control section 401 uses a PUCCH format based on a total number of bits of the plurality of HARQ-ACKs.

The transmission signal generation section 402 generates uplink signals (uplink control signals, uplink data signals, uplink reference signals and so on) based on instructions from the control section 401, and outputs the uplink signals to the mapping section 403. The transmission signal generation section 402 can be constituted with a signal generator, a signal generation circuit or signal generation apparatus that can be described based on general understanding of the technical field to which the present invention pertains.

For example, the transmission signal generation section 402 generates an uplink control signal about transmission confirmation information, the channel state information (CSI), and so on, based on instructions from the control section 401. The transmission signal generation section 402 generates uplink data signals, based on instructions from the control section 401. For example, when a UL grant is included in a downlink control signal that is reported from the radio base station 10, the control section 401 instructs the transmission signal generation section 402 to generate the uplink data signal.

The mapping section 403 maps the uplink signals generated in the transmission signal generation section 402 to radio resources, based on instructions from the control section 401, and outputs the result to the transmitting/receiving sections 203. The mapping section 403 can be constituted with a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present invention pertains. The received signal processing section 404 can constitute the receiving section according to the present invention.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present invention pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 12:
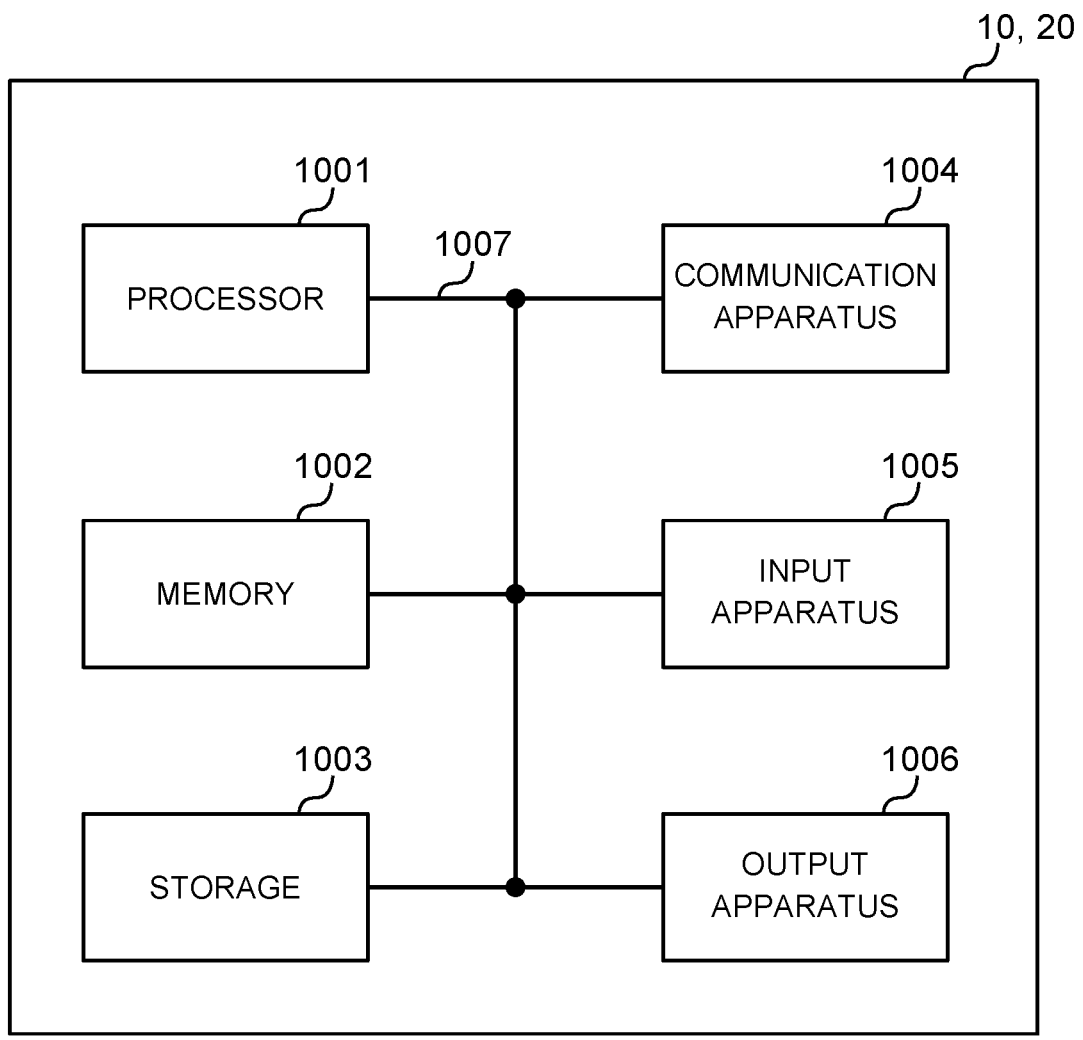
FIG. 12 is a diagram to show an example of a hardware structure of the radio base station and the user terminal according to one embodiment.

For example, a radio base station, a user terminal, and so on according to one embodiment of the present invention may function as a computer that executes the processes of the radio communication method of the present invention. FIG. 12 is a diagram to show an example of a hardware structure of the radio base station and the user terminal according to one embodiment of the present invention. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control reading and/or writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present invention.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via a wired and/or wireless network, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in this specification and/or the terminology that is needed to understand this specification may be replaced by other terms that convey the same or similar meanings. For example, "channels" and/or "symbols" may be "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks, and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers, and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (master information block (MIB), system information blocks (SIBs), and so on), MAC (Medium Access Control) signaling and so on), and other signals or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" used in this specification can be used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads)). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up, (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions and/or (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described in this specification. The present invention can be implemented with various corrections and in various modifications, without departing from the spirit and scope of the present invention defined by the recitations of claims. Consequently, the description in this specification is provided only for the purpose of explaining examples, and should by no means be construed to limit the present invention in any way.

What is claimed is:

1. A terminal comprising:
   a processor that controls, when a repeated transmission of a first uplink control channel overlaps, in a slot, a repeated transmission of a second uplink control channel, and a starting slot for the repeated transmission of the first uplink control channel is earlier than the starting slot for the repeated transmission of the second uplink control channel, the first uplink control channel to be transmitted in the slot, and controls the second uplink control channel not to be transmitted in the slot; and
   a transmitter that transmits the first uplink control channel in the slot.

2. A radio communication method for a terminal, the method comprising:
   controlling, when a repeated transmission of a first uplink control channel overlaps, in a slot, a repeated transmission of a second uplink control channel, and a starting slot for the repeated transmission of the first uplink control channel is earlier than the starting slot for the repeated transmission of the second uplink control channel, the first uplink control channel to be transmitted in the slot, and controlling the second uplink control channel not to be transmitted in the slot; and
   transmitting the first uplink control channel in the slot.

3. A base station comprising:
   a processor that controls, when a repeated transmission of a first uplink control channel overlaps, in a slot, a repeated transmission of a second uplink control channel, and a starting slot for the repeated transmission of the first uplink control channel is earlier than the starting slot for the repeated transmission of the second uplink control channel, the first uplink control channel to be transmitted in the slot, and controls the second uplink control channel not to be transmitted in the slot; and
   a receiver that receives the first uplink control channel in the slot.

4. A system comprising a terminal and a base station, wherein
   the terminal comprises:
      a first processor that controls, when a repeated transmission of a first uplink control channel overlaps, in a slot, a repeated transmission of a second uplink control channel, and a starting slot for the repeated transmission of the first uplink control channel is earlier than the starting slot for the repeated transmission of the second uplink control channel, the first uplink control channel to be transmitted in the slot, and controls the second uplink control channel not to be transmitted in the slot; and a transmitter that transmits the first uplink control channel in the slot, and the base station comprises:

a second processor that controls reception of the first uplink control channel transmitted from the terminal in the slot.

5. The terminal according to claim 1, wherein the first uplink control channel to be transmitted in the slot is determined based on a selection criterion, and the selection criterion is based on information corresponding to a priority of the repeated transmission.

\* \* \* \* \*